(12) United States Patent
Kawase et al.

(10) Patent No.: US 7,655,354 B2
(45) Date of Patent: Feb. 2, 2010

(54) BATTERY

(75) Inventors: Kenichi Kawase, Fukushima (JP); Nozomu Morita, Fukushima (JP); Isamu Konishiike, Fukushima (JP)

(73) Assignee: Sony Corporation, Tokyo (JP)

( * ) Notice: Subject to any disclaimer, the term of this patent is extended or adjusted under 35 U.S.C. 154(b) by 37 days.

(21) Appl. No.: 11/687,843

(22) Filed: Mar. 19, 2007

(65) Prior Publication Data
US 2008/0220337 A1      Sep. 11, 2008

(30) Foreign Application Priority Data
Mar. 30, 2006    (JP)    ............................ P2006-095641

(51) Int. Cl.
  H01M 6/16    (2006.01)
  H01M 4/58    (2006.01)
  H01M 4/40    (2006.01)
(52) U.S. Cl. .................... 429/209; 429/218.1; 429/188; 429/338
(58) Field of Classification Search .................. 429/209, 429/218.1, 188
See application file for complete search history.

(56) References Cited

U.S. PATENT DOCUMENTS

| | | | |
|---|---|---|---|
| 6,325,611 B1 * | 12/2001 | Iwasaki et al. | ............... 425/164 |
| 2006/0199078 A1 * | 9/2006 | Koshina | ................ 429/231.95 |
| 2007/0072086 A1 * | 3/2007 | Nakagawa | .................. 429/330 |

FOREIGN PATENT DOCUMENTS

JP    2003-007305    *    1/2003

* cited by examiner

Primary Examiner—Patrick Ryan
Assistant Examiner—Angela J. Martin
(74) Attorney, Agent, or Firm—Sonnenschein Nath & Rosenthal LLP

(57) ABSTRACT

There is provided a battery including a positive electrode that includes an active material layer formed on a positive electrode current collector; a negative electrode that includes active material layers formed on first and second principal planes of a negative electrode current collector and the active material layer on the second principal plane has an alloyed region smaller than an alloyed region the active material layer has on the first principal plane between the second principal plane and the current collector; and an electrolyte.

13 Claims, 3 Drawing Sheets

BATTERY

CROSS REFERENCES TO RELATED APPLICATIONS

The present invention contains subject matter related to Japanese Patent Application JP 2006-095641 filed in the Japanese Patent Office on Mar. 30, 2006, the entire contents of which being incorporated herein by reference.

BACKGROUND OF THE INVENTION

1. Field of the Invention

The present invention relates to a battery including a positive electrode, a negative electrode and an electrolyte.

2. Description of the Related Art

With progress in science and technology such as semiconductor technology, personal computers (PCs), mobile phones, and the like have been developed, and batteries utilized as power supply for electronic apparatus have been expected to facilitate handling of the batteries such as reduction in size and weight, and to exhibit excellent electric characteristics.

In view of such expectations, the following types of lithium-ion secondary batteries have been developed and have widely been used: a lithium-ion secondary battery having a graphite material that uses an intercalation reaction of lithium (Li) between graphite layers, or a lithium-ion secondary battery utilizing a carbonaceous material as a negative electrode active material to which lithium insertion and extraction into pores are applied.

In recent years, as increasing in power and time consumed for the electronic apparatus due to higher performance of the electronic apparatus, an increase in capacity and power generation of a secondary battery have been desired, and especially in capacity, an improvement in characteristics has much been desired. In particular, of battery capacity and cycle characteristics, more improvements of characteristics are desired and studies on arrangements of a negative electrode (current collector and active material layer formed on the surface of the current collector) have proceeded.

A battery including a negative electrode active material layer formed of a carbon material such as graphite is difficult to improve characteristics greatly because a battery capacity of the negative electrode active material is near the theoretical limit, and hence a research of an alloy-based negative active material containing silicon (Si) and tin (Sn) also has proceeded.

However, according to such alloy-based negative active material, a volume of a battery changes considerably when the battery is charged and discharged. As a result, large stress is applied to electrodes so that the electrodes are deformed, causing an interface between the positive and negative electrodes unstable or the structure of the active material layer collapsed, thereby resulting in cycle characteristics being lowered.

Also, as a method of improving cycle characteristics of the active material of which volume changes considerably, Japanese Unexamined Patent Publication No. 2003-7305 puts forward experiments on improving cycle characteristics by using an arrangement in which both principal planes of a thin plate-shaped current collector is formed as rough surfaces or an arrangement in which an active material is deposited on a current collector so that a current collector interface is alloyed with heat generated upon film deposition or subsequent heat treatment to thereby increase bonding strength have been made so far.

However, since the electrode formed by the above-mentioned method that applies large stress to the current collector, the electrode is caused to either crack or deform so that satisfactory characteristics may not be obtained.

Further, if it is intended to improve battery capacity by a negative electrode arrangement in which an active material layer is formed (supported) not on one principal plane but on both principal planes of a film-shape (strip-shape or thin plate-shaped) current collector, the electrode in which active material layers whose volumes change considerably are supported on both surfaces of the current collector is caused to apply large stress to the current collector when the battery is charged and discharged. As a result, it is unavoidable that cycle characteristics are lowered and that the electrode is either cracked or fractured.

SUMMARY OF THE INVENTION

In view of the aforementioned aspects, according to an embodiment of the present invention, there is provided a battery with excellent characteristics that can prevent an electrode from crack or fracture.

According to an embodiment of the present invention, there is provided a battery including a positive electrode that includes an active material layer formed on a positive electrode current collector, a negative electrode that includes active material layers formed on first and second principal planes of a negative electrode current collector and the active material layer on the second principal plane has an alloyed region smaller than an alloyed region the active material layer has on the first principal plane between the second principal plane and the current collector, and an electrolyte.

According to an embodiment of the battery of the present invention, the active material layer is formed at least on the first principal plane of the first and second principal planes of the negative electrode current collector and the active material layer on the second principal plane includes the alloyed region smaller than that on the first principal plane between the second principal plane and the current collector. Thus, since the battery including the negative electrode having the active material of which volume changes considerably when the battery is charged and discharged is supported on both surfaces of the current collector, the negative electrode can be suppressed from either being cracked or fractured.

DESCRIPTION OF THE PREFERRED EMBODIMENTS

Embodiments of the present invention will be described below with reference to the drawings.

First Embodiment

A battery according to a first embodiment of the present invention will be described. The embodiment of the present invention will be described with reference to an example of a battery having a winding structure that includes a laminate film applied as the outer covering member as shown in a perspective view FIG. 1A, where respective members are separated and one portion of a member is sectioned.

Figure 1A:
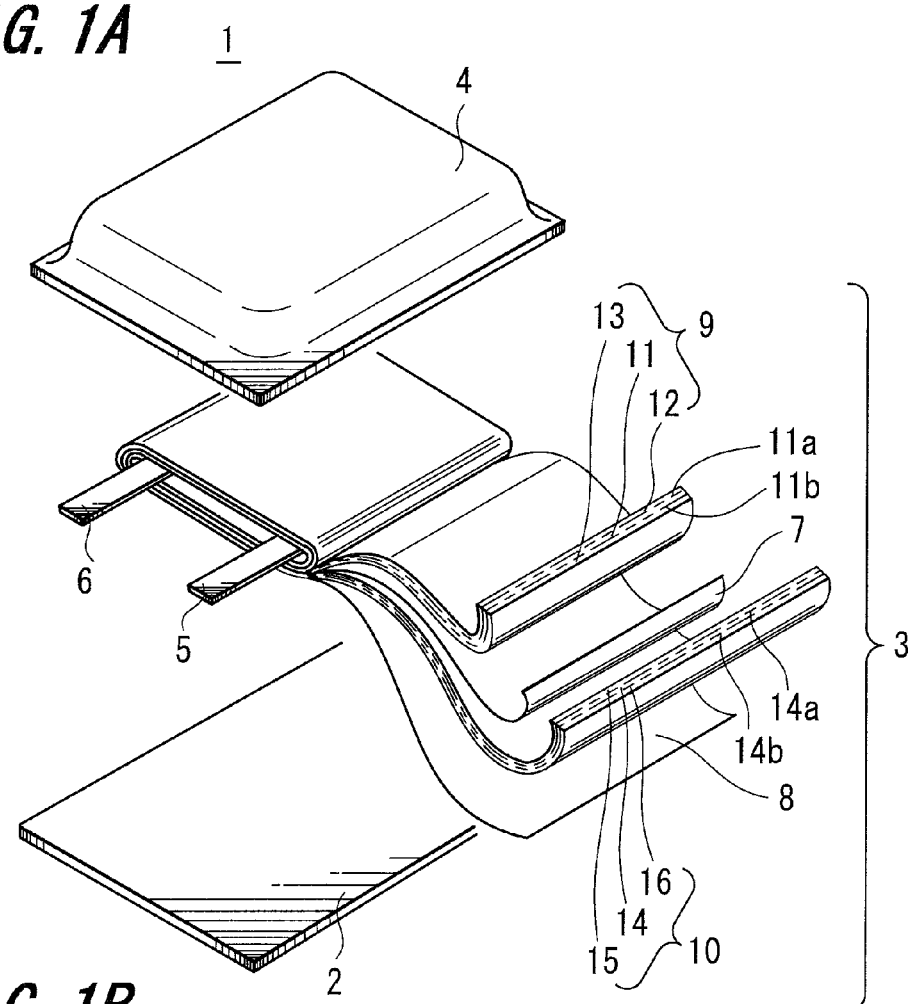
FIG. 1A is a schematic perspective view showing an example of a partially sectioned battery configuration according to an embodiment of the present invention.

As shown in FIG. 1A, a battery 1 according to an embodiment of the present invention includes an electrode winding body 3 accommodated in an airtight structure formed by exterior members 2, 4, and only later described lead wires 5 and 6 are led out from the electrode winding body 3 to outside of the airtight structure in the same direction.

Figure 1B:
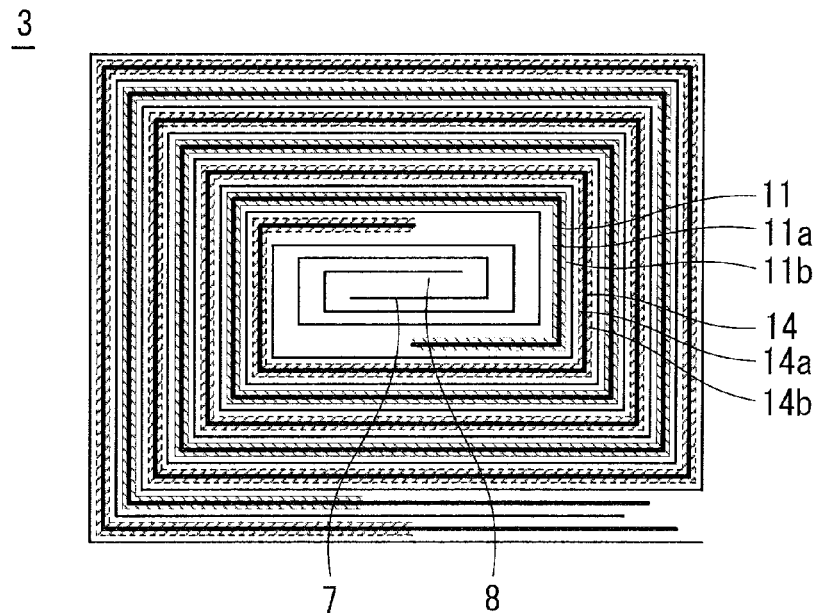
FIG. 1B is a schematic cross-sectional view showing an example of a battery configuration according to an embodiment of the present invention.

As FIG. 1B schematically shows a cross-sectional structure of a winding surface, the electrode winding body 3 according to the embodiment of the present invention is configured such that strip-shaped (thin plate-shaped) positive and negative electrodes 9 and 10 are faced to each other through separators 7 and 8 containing electrolytes. These positive and negative electrodes 9, 10 and the separators 7, 8 are wound to configure the electrode winding body 3. Although not shown in the figure, the outermost peripheral portion of the electrode winding body 3 is protected by a protective film.

It should be noted that, although the electrode winding body 3 is wound in a rectangular manner as schematically shown in FIG. 1B, the electrode winding body 3 has an ellipse-like curved section (non-curved bent portion) in the airtight structure formed by the exterior members 2, 4.

The lead wires 5 and 6 are electrically connected to the later described positive and negative electrodes 9 and 10 respectively to form thin-plate or mesh-like lead wires using a metal material such as aluminum (Al), copper (Cu), nickel (Ni) and stainless steel.

Each of the exterior members 2, 4 includes a rectangular aluminum laminated film formed by bonding a nylon film, an aluminum foil and a polypropylene film in this order. The exterior members 2, 4 are located such that the side of polypropylene faces the electrode winding body 3 and outer edge portions of the side of polypropylene and the electrode winding body 3 are closely bonded each other by fusion or with an adhesive. Adhesive films (not shown) may optionally be inserted between the exterior members 2, 4 and the lead wires 5, 6 in order to prevent ambient air from entering.

It should be noted that the exterior members 2, 4 may be formed using laminated films having other structures, polymer films such as polypropylene, or metal films, instead of the above-mentioned aluminum laminated film.

For example, the positive electrode 9 includes a positive electrode current collector 11 with a first principal plane 11a corresponding to the inner surface and a second principal plane corresponding to the outer surface of the winding structure. A first positive electrode active material layer 12 is formed on the side of the first principal plane 11a and a second positive electrode active material layer 13 is formed on the side of the second principal plane 11b, respectively.

Both the first positive electrode active material layer 12 and the second positive electrode active material layer 13 may not necessarily be provided. It is preferable that the first positive electrode active material layer 12 and the second positive electrode active material layer 13 be selectively provided according to a desired configuration or desired characteristics of an objective battery. The positive electrode current collector 11 may be formed of aluminum, nickel, stainless steel, or the like.

The first positive electrode active material layer 12 and the second positive electrode active material layer 13 contain any one of or two or more of positive electrode materials that can insert and extract lithium ions as a positive electrode active material and may optionally contain a conductive material such as a carbon material and a binder such as poly(vinylidene fluoride). A lithium transition metal composite oxide containing lithium and transition metal may be preferable as a positive electrode material that can insert and extract lithium ions because the lithium transition metal composite oxide can generate a high voltage and a high energy density. The lithium transition metal composite oxide may be shown by a general formula $Li_xMO_2$. M preferably represents at least one of transition metal elements and may also preferably contain at least one of cobalt and nickel. The subscript x represents the value that may vary with the charging and discharging state of the battery and may fall in the range of $0.5 \leq x \leq 1.10$. The specific examples of lithium transition metal composite oxide may include $LiCoO_2$ or $LiNiO_2$.

It should be noted that when using a particulate lithium transition metal complex oxide as a positive electrode active material, powder of such particulate lithium transition metal complex oxide may directly be used; or may include a surface layer having the particulate lithium transition metal composite oxide, part of which contains at least one oxide that is different from the oxide contained in the composition selected from the group consisting of halide, phosphate and sulfate. This improves stability and suppresses lowering battery capacity. Specifically, lithium fluoride may preferably used as metallic halide.

It should be noted that the elements of the surface layer and the lithium transition metal composite oxide may mutually be diffused.

Further, the first positive electrode active material layer 12 and the second positive electrode active material layer 13 may preferably contain at least one compound selected from the group consisting of individual elements and compounds including elements of Group 2, Group 3 or Group 4 in a long-term periodic table. This improves stability and suppresses lowering battery capacity. The preferable examples of the elements of Group 2 include magnesium (Mg), calcium (Ca), strontium (Sr), and the like, with magnesium (Mg) being most preferable. The preferable examples of the elements of Group 3 include scandium (Sc), yttrium (Y), and the like, with yttrium (Y) being most preferable. The preferable examples of the elements of Group 4 include titanium (Ti), zirconium (Zr), and the like, with zirconium (Zr) being most preferable. The elements may be in the form of solid solution or in the form of a individual element or a compound in the grain boundary of the positive electrode active material.

On the one hand, the negative electrode 10 includes the negative electrode current collector 14 having a first principal plane 14a corresponding to an inner surface and a second principal plane 14b corresponding to an outer surface in the winding structure in which a first positive electrode active material layer 15 is formed on the side of the first principal plane 14 and a second positive electrode active material layer 16 is formed on the side of the second principal plane 14b respectively. The first negative electrode active material layer 15 and the second negative electrode active material layer 16 may preferably include a metal material containing at least one metal element selected from the elements which may not form an intermetallic compound with lithium (Li). If the intermetallic compound are formed with the lithium (Li), the negative electrode current collector 14 will be expanded and contracted so that structural destruction may be observed, thereby lowering current collector characteristics. In addition, since the ability to support the first negative electrode active material layer 15 and the second negative electrode active material layer 16 is reduced in the negative electrode current collector 14, the first and second negative electrode active material layers 15 and 16 may come off from the negative electrode current collector 14. Examples of the metal elements which may not form the intermetallic compound with the lithium (Li) include copper (Cu), nickel (Ni), titanium (Ti), iron (Fe), chromium (Cr), and the like.

Metal materials forming the negative electrode current collector 14 may preferably be metal materials containing metal elements that can be alloyed with the first and second negative electrode active material layers 15 and 16. Such metal materials can improve adhesion between the respective active material layers 15, 16 and the negative electrode current collector 14, and can suppress the respective active material layers 15, 16 from coming off from the negative electrode current collector 14. When the respective active material layers 15 and 16 contain silicon (Si) as the an element as will be described later, Examples of the metal elements that do not form the intermetallic compound with the lithium (Li) but that may be alloyed with the respective active material layers 15 and 16 include copper (Cu), nickel (Ni), iron (Fe), and the like. Of these metal elements, copper (Cu) may be preferable due to having sufficient strength and conductivity.

Further, the negative electrode current collector 14 may include either a single layer or a plurality of layers. In that case, layers that contact with the first and second negative electrode active material layers 15 and 16 may be formed of metal materials that can be alloyed with the silicon (Si) and other layers may be formed of other metal materials.

The first and second negative electrode active material layers 15 and 16 contain silicon (Si) as a an element and may be formed as either columnar layers or block-shaped layers.

Silicon (Si) has a strong ability to insert and extract lithium (Li) and capable of generating high energy density.

The first and second negative electrode active material layers 15 and 16 may contain the silicon (Si) in the form of either a individual element or an alloy or a compound.

In the battery 1 according to the embodiment of the present invention, the negative electrode 10 is configured such that the active material layers 15 and 16 are formed on the first and second principal planes 14a and 14b of the negative electrode current collector 14 and the outer surface positive electrode active material layer 16 formed on the second principal plane 14b has an alloyed region smaller than the outer surface positive electrode active material layer 15 formed on the first principal plane 14a between the outer surface positive electrode active material layer 16 and the current collector.

Here, as the small alloyed region, an alloyed region in a small ratio at which metal materials form a chemical bond at a interface portion between the active material and the current collector and which has a small volume of region in which components of metal materials are mutually diffused can be given.

Specifically, the negative electrode 10 has an arrangement in which the inner surface negative electrode active material layer 15 is formed as either a columnar negative electrode active material layer or a block-shaped negative electrode active material layer and in which the outer surface negative electrode active material layer 16 is formed as a powdery negative electrode active material layer, respectively. In the present application, areas which may not be alloyed may be contained in smaller regions.

It should be noted that a plurality of powdery active materials are frequently caused to gather and change into secondary particulate block shapes as a battery in which active material layers are formed of materials having large expansion and contraction are charged and discharged. However, in the battery according to an embodiment of the present invention, when the second negative electrode active material layer 16 formed on the second principal plane 14b is formed as a secondary particle block-shaped shape, a difference between the second negative electrode active layers 15 and the first negative electrode active material layer 15 may be observed by microscopy using a scanning Auger microprobe and a SEM (scanning electron microscope).

Further, the first and second negative electrode active layers 15 and 16 forming the negative electrode may preferably contain oxygen content within a range of from 3 atomic % to 45 atomic % and may preferably have a multilayer structure having high oxygen concentration areas and low oxygen concentration areas repeatedly formed in the direction approximately perpendicular to the first principal plane 14a.

In the surface roughness of the negative electrode current collector 14, roughness Ra of the principal plane on the side with high roughness may be equal to or greater than 0.2 μm. If the roughness Ra is equal to or greater than 0.2 μm as described above, adhesion will be increased as will be described later. However, when an extreme rough treatment is carried out, if roughness of both surfaces of the negative electrode current collector 14 is lowered to differentiate one from the other, the negative electrode current collector 14 may cause either crack or fracture.

It should be noted that the value of the roughness Ra is a surface roughness parameter of the JIS (Japanese Industrial Standard) standard, implying the arithmetic mean surface roughness.

It should be noted that the optimum value of the roughness Ra and the range thereof are affected by the thickness of the current collector. For example, if a current collector having a thickness of about 5 to 20 μm available at present is unused but instead a thicker current collector is used, drastic roughness may be suppressed to result in less crack or fracture. Therefore, it is preferable that the optimum value of the roughness Ra and the range thereof be carefully selected based on the relationship. However, a battery having an extremely thick current collector may not increase capacity of the battery due to an increase in the volume of the current collector portion.

In this embodiment, the aforementioned range may be preferable for the value of the roughness Ra in which cycle characteristics may be maintained and the current collector can be prevented from being either cracked or fractured by using the current collector having a thickness of approximately 5 to 30 μm and which can prevent the battery capacity from being lowered while improving adhesion between the current collector and the active material layers.

The first and second negative electrode active material layers 15 and 16 may also contain oxygen as an element because oxygen may suppress the battery from being lowered in capacity and being expanded by preventing the respective negative electrode active material layers 15 and 16 from being expanded and contracted. Part of oxygen contained in the respective negative electrode active material layers 15 and 16 may preferably be bonded to silicon, and the bonded state may either be silicon monoxide or silicon dioxide. Alternatively, the bonded state may be other metastable state. Further, the content of oxygen in the respective active material layers 15 and 16 may preferably be selected between 3 atomic % and 45 atomic %. If the content of oxygen is less than values in the above-mentioned range, sufficient effects may not be obtained. If the content of oxygen is larger than values in the above-mentioned range, the battery capacity may be lowered.

In addition, resistance in the respective negative electrode active material layers 15 and 16 are increased, the respective negative electrode active material layers 15 and 16 are expanded by locally inserting lithium or cycle characteristics are lowered. It should be noted that the first and second negative electrode active material layers 15 and 16 do not contain coating formed on the surfaces of the respective negative electrode active material layers 15 and 16 using an electrolytic solution when the battery is charged and discharged. Therefore, when the content of oxygen in the respective negative electrode active material layers 15 and 16 are calculated, oxygen contained in the above coating are not included in the calculation.

It should be noted that the first and second negative electrode active material layers 15 and 16 may contain at least one type of elements other than silicon (Si) and oxygen (O). Other elements may be cobalt (Co), iron (Fe), tin (Sn), nickel (Ni), copper (Cu), zinc (Zn), indium (In), silver (Ag), titanium (Ti), germanium (Ge), bismuth (Bi), antimony (Sb) or chromium (Cr).

Of high capacity active materials that can form the first and second negative electrode active materials 15 and 16, some of the high capacity active materials may change the volume drastically when the battery is charged and discharged. In particular, If the above high capacity active material contains elements such as silicon (Si) and tin (Sn), when the active material layer is thin, the volume of the active material layer changes considerably so that the active material layer may come off from the interface of the current collector as the battery is charged and discharged, and stress is applied to an entire inside of the battery. Further, such stress causes the electrode to be either cracked or fractured. According to the arrangement of the battery of the embodiment of the present invention, the arrangement of the aforementioned negative electrode can decrease or prevent load applied to the entire battery.

Part of the first and negative electrode active material layers 15 and 16 may preferably be formed by at least one method selected from the group consisting of a vapor-phase method, a spraying method, a baking method and a liquid-phase method. This arrangement can suppress the battery from being destroyed as the respective negative electrode active material layers 15 and 16 are expanded and contracted when the battery is charged and discharged and the negative electrode current collector 14 and the respective negative electrode active material layers 15 and 16 can be integrated, thereby improving electron conductivity in the respective negative electrode active material layers 15 and 16.

The first and second negative electrode active material layers 15 and 16 may preferably be alloyed with the negative electrode current collector 14 at least on one part of the interface between the first and second negative electrode active material layers 15 and 16 and the negative electrode current collector 14 because adhesion between the first and second negative electrode active material layers 15 and 16 and the negative electrode current collector 14 may be improved according to the aforementioned arrangement. Specifically, at the interface, elements of the negative electrode current collector 14 may preferably be diffused into the respective negative electrode active material layers 15 and 16 or elements of the respective negative electrode active material layers 15 and 16 may preferably be diffused into the negative electrode current collector 14 or the elements may preferably be diffused to each other. It should be noted that the above-mentioned diffusion of elements may be included in alloying in the application of the present invention.

The separators 7 and 8 may separate the positive electrode 9 and the negative electrode 10 from each other and may permeate lithium ions while preventing an electric current from being short-circuit when both the positive and negative electrodes 9 and 10 contact with each other. The positive and negative electrodes 9 and 10 may be formed of polyethylene or polypropylene, and the like.

The separators 7 and 8 are impregnated with an electrolytic solution. The electrolytic solution may contain a solvent and an electrolytic salt dissolved into the solvent, and may optionally contain an additive.

As the preferable examples of the solvent forming the electrolytic solution, cyclic carbonate having unsaturated bond such as 1,3-dioxolium-2-on or 4-vinyl-1,3-dioxolium-2-on may be used by mixing into the solvent. In particular, if 1,3-dioxolium-2-on and 4-vinyl-1,3-dioxolane-2-on are used in combination, higher effects may be obtained.

Further, in addition to vinylene carbonate, vinyl ethylene carbonate, and the like, carbonate derivatives having halogen atoms such as fluoroethylene carbonate may be mixed into the solvent because the battery capacity may be suppressed from being lowered based on the resultant solvent. In this case, it is more preferable that cyclic carbonate having unsaturated bond may be mixed into the resultant solvent because the mixture may achieve higher effects.

Although the carbonate derivative having halogen atoms may either be a cyclic compound or a chain compound, it is preferable that the cyclic compound may be used owing to achieving higher effects. As preferable examples of such cyclic compound include 4-fluoro-1,3-dioxolane-2-on, 4-chloro-1,3-dioxolane-2-on, 4-promo-1,3-dioxolane-2-on or 4,5-difluoro-1, 3-dioxolane-2-on. Of these, 4-fluoro-1,3-dioxolane-2-on may be preferable owing to achieving higher effects.

Examples of the electrolytic salt include Lithium salts such as $LiPF_6$, $LiCF_3SO_3$ or $LiClO_4$. The above electrolytic salts may be used alone or a combination of two or more.

Further, as examples of other substance forming solvent, ethylene carbonate, propylene carbonate, dimethyl carbonate, diethyl carbonate or carbonate such as ethyl methyl carbonate may be given. For example, if high melting-point solvents such as ethylene carbonate or propylene carbonate and low melting-point solvents such as dimethyl carbonate, diethyl carbonate or ethyl methyl carbonate are combined to be used, such mixed solvents may be preferable due to achieving high ion conductivity.

The solvent may preferably contain sultone, which may improve stability of the electrolytic solution, thereby suppressing the battery from being expanded due to decomposition and reaction. Specifically, a solvent having an unsaturated bond within a ring may be preferable, and 1,3-propene sultone may be particularly preferable.

It should be noted that, while the electrolyte may be directly used, the electrolyte may be held with a high molecular compound so as to produce a gel-form electrolyte. In that case, the electrolyte may be impregnated with the separators 7, 8, or may be inserted between the separators 7, 8 and the negative electrode 13, or between the separators 7, 8 and the positive electrode 14 in the form of laminate. A polymer containing vinylidene fluoride may preferably be used as a polymer material due to high oxidation-reduction stability. Further, a high molecular compound polymerized with a polymerized compound may preferably be used as a high molecular compound. Examples of the polymerized compound include a monofunctional acrylate such as acrylic ester, methacrylic ester, multifunctional acrylate such as diacrylc ester, triacrylic ester, acrylonitrile, methacrylonitrile.

Of these, ester having an acrylate group or a methacrylate group may be preferable due to polymerizability and a high reaction rate of polymerized compound.

Second Embodiment

A battery according to a second embodiment of the present invention will be described.

In this embodiment, a battery type different from the first embodiment will be described with reference to an element winding type cylindrical battery shown in a partially sectioned perspective view of FIG. 2.

Figure 2:
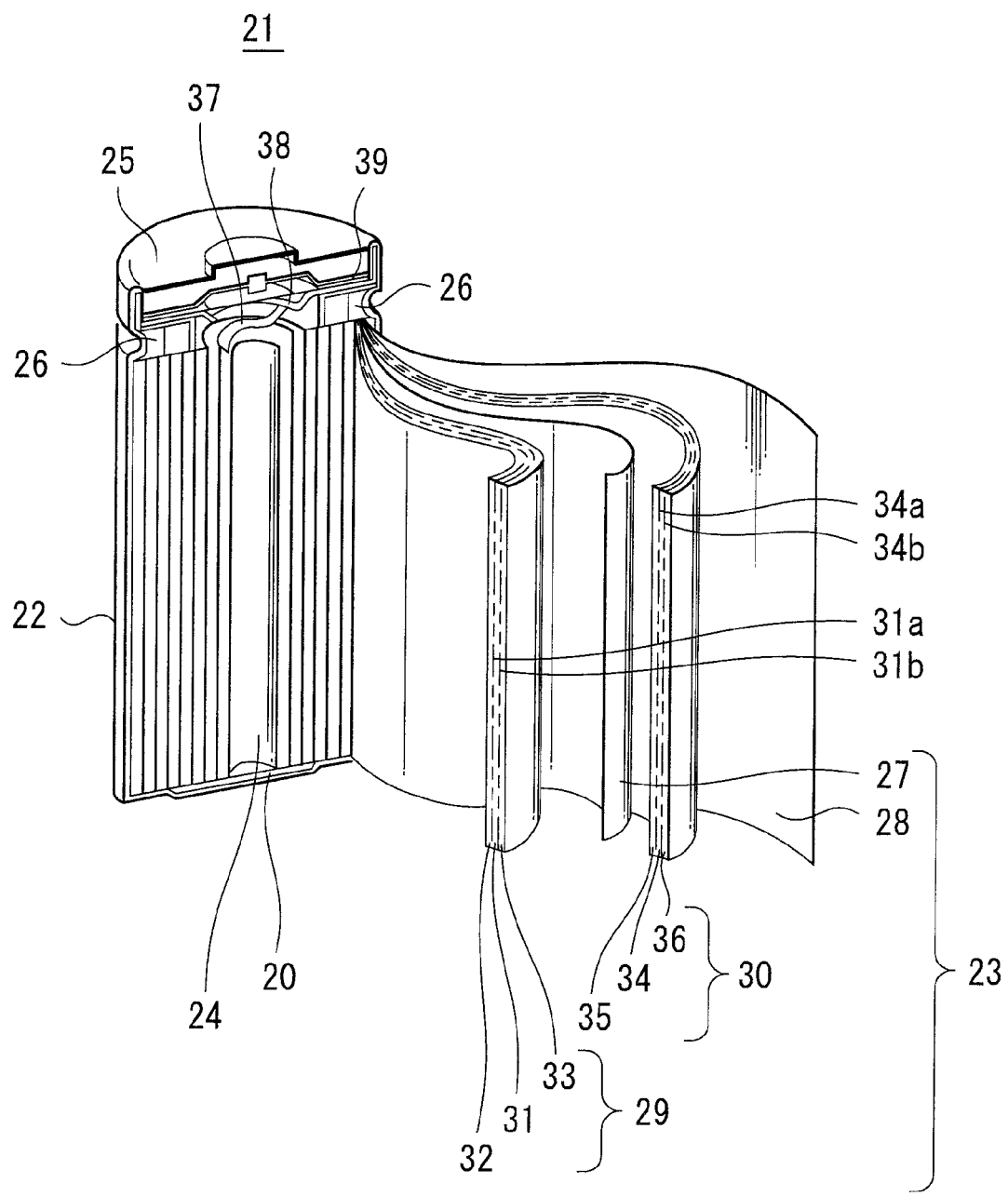
FIG. 2 is a schematic perspective view showing another example of a partially sectioned battery configuration according to an embodiment of the present invention.

As shown in FIG. 2, a battery 21 according to the embodiment of the present invention includes a cylindrical battery can 22 having the upper surface opened where a electrode winding body 23 is located at a center pin 24 (not shown) and which is sealed by a battery lid 25.

The battery can 22 includes a nickel-plated iron, and the electrode winding body 23 has an arrangement in which a positive electrode 29 and a negative electrode 30 similarly wound are located in facing manner through a pair of wound separators 27, 28 containing an electrolyte.

The battery lid 25 includes a safety valve mechanism 38 with a heat sensitive resistance element (Positive Temperature Coefficient; hereinafter simply referred to as a "PTC element") 39 incorporated therein, which is attached to the battery can 22 when caulked through gaskets (not shown) and the like. That is, the inside of the battery 21 is hermetically closed by the battery can 22 and the battery lid 25.

The safety valve mechanism 38 is electrically connected to the battery lid 25 through the PTC element 39. When an internal pressure of the battery 21 is increased to be equal to or higher than a constant value due to internal short-circuit or due to heat applied from outside, an incorporated disk plate may cause inversion of the disk, thereby disconnecting electric connection between the battery lid 25 and the electrode winding body 23. The PTC element 39 may prevent abnormal heat by increasing resistance to limit an electric current increase when a temperature rises.

In this embodiment, the electrode winding body 23 has an arrangement in which the strip-shape (thin plate-shaped) positive and negative electrodes 29 and 30 are located in facing manner through the separators 27 and 28 containing an electrolyte. These positive and negative electrodes 29 and 30 are wound around the electrode winding body 23.

A positive lead wire made of aluminum (Al) and a negative lead wire made of nickel (Ni)(not shown) are respectively connected to the positive electrode 29 and the negative electrode 30 of the electrode winding body 23. A positive lead wire is welded on the safety valve mechanism 38 and electrically connected to the battery lid 25, and the negative lead wire is directly welded on the battery can 22, thereby electrically connecting thereto.

Here, the positive electrode 29 includes a positive electrode current collector 31 including a first principal plane 31a corresponding to an inner surface in the winding structure and a second principal plane 31b corresponding to an outer surface where a first positive electrode active material layer 32 is supported at the side of the first principal plane 31a and a second positive electrode active material layer 33 is supported at the side of the second principal plane 31b.

Both of the first and second positive electrode active material layers 32 and 33 may not always be provided and may preferably be selected and formed in response to intended battery arrangement and characteristics. The positive electrode current collector 31 may be made of aluminum (Al), nickel (Ni) or stainless steel, for example.

The first and second positive electrode active material layers 32 and 33 may contain a positive electrode active material and may optionally include a conductivity assisting agent such as a carbonaceous material and a binder such as polyvinylidene fluoride. A lithium containing metal composite oxide shown by a general formula $Li_xMO_2$, for example, may preferably be used as the positive electrode active material because the lithium containing metal composite oxide may generate a high voltage and include high density, thereby increasing the capacity of the secondary battery. It should be noted that M is at least one type of transition selected from the group consisting of cobalt (Co), nickel (Ni) and manganese (Mn). The x may vary with states of the battery charging and discharging, and a value is generally selected within a range of $0.05 \leq x \leq 1.10$. As specific examples of such lithium containing metal composite oxide, $LiCoO_2$ or $LiNiO_2$ may be given. It should be noted that the positive electrode active material may be used alone or a combination of two or more.

On the other hand, the negative electrode 30 includes a negative electrode current collector 34 having a first principal plane 34a corresponding to an inner surface in the winding structure and a second principal plane 34b corresponding to an outer surface and in which a first negative electrode active material layer 35 is supported at the side of the first principal plane 34a and a second negative electrode active material layer 36 is supported at the side of the second principal plane 34b.

It should be noted that both of the first and second negative electrode active material layers 35 and 36 may not always be provided as will be described later.

The negative electrode current collector 34 may preferably be made of copper (Cu), stainless steel, nickel (Ni), titanium (Ti), tungsten (W), molybdenum (Mo) or aluminum (Al) and more preferably, the negative electrode current collector 34 may be made of a metal which is easy to be alloyed with the first and second negative electrode active material layers 35 and 36. For example, when the first and second negative electrode active material layers 35 and 36 contain at least one kind elements or compounds selected from a group consisting of individual elements or compounds of silicon (Si) and tin (Sn), copper (Cu), titanium (Ti), aluminum (Al) or nickel (Ni). These elements or compounds may be given as the materials which are easy to be alloyed with the first and second negative electrode active material layers 35 and 36.

It should be noted that the negative electrode current collector 34 may be formed of either a single layer or a plurality of layers. In that case, the layers which contact with the first and second negative electrode active material layers 35 and 36 may be made of metal materials which are easy to be alloyed with the first and second negative electrode active material layers 35 and 36 and other layers may be made of other metal materials.

The first and second negative electrode active material layers 35 and 36 may contain at least one kind of individual elements or compounds selected from the group consisting of metal elements or semimetal elements which can be alloyed with lithium (Li) as a negative electrode active material due to obtaining high energy density.

Examples of such metal elements or semimetal elements include palladium (Pd), platinum (Pt), zinc (Zn), cadmium (Cd), mercury (Hg), aluminum (Al), indium (In), silicon (Si), germanium (Ge), tin (Sn), lead (Pb), arsenic (As), antimony (Sb) or bismuth (Bi). As examples of these compounds, compounds shown by the chemical formula $Ma_sMb_t$ may be given. In the chemical formula, Ma represents at least one kind of metal elements and semimetal elements which can be alloyed with lithium (Li) and Mb represents at least one kind of elements other than Ma. The value s is s>0 and the value t is t≧0, respectively.

Of these metal elements and semimetal elements, individual elements or compounds of silicon (Si), germanium (Ge), tin (Sn) or lead (Pb) may be preferable and particularly-preferable metal elements and semimetal elements are individual elements of the aforementioned silicon (Si) or tin (Sn) or compounds thereof. The reason for this is that the individual element and the compound of silicon (Si) or tin (Sn) have large ability to insert and extract lithium (Li) and that they are able to increase energy density of the negative electrode 30 depending on a combination thereof. It should be noted that the compound of silicon (Si) and tin (Sn) may either be crystal or amorphous and that it may preferably be a polymer of amorphous or microcrystal. The amorphous or microcrystal may have a pattern in which a half width of a peak of a diffraction pattern obtained by X-ray diffraction analysis using CuKα as characteristic X-rays is higher than 0.5° at 2θ and it may also have a broad pattern in which a half width ranges of from 30° to 60° at 2θ.

Examples of the compound of silicon (Si) and tin (Sn), include $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SicO_v$ ($0<v\leq2$), $SnO_w$ ($0<w\leq2$), $SnSiO_3$, LiSiO or LiSnO.

Some of high capacity active materials that can form the first and second negative electrode active material layer 35 and 36 of the negative electrode 30 may drastically change the volume when the battery is charged and discharged as described earlier. In particular, if the high capacity active material contains silicon (Si) or tin (Sn), when the active material layer is thin, the volume may change considerably to peel off the layer from the interface of the current collector and to apply stress to the entire inside of the battery when the battery is charged and discharged, thereby further causing the electrode to be either cracked or fractured. In the same manner as the first embodiment of the present invention, according to the arrangement of the battery according to the embodiment of the present invention, it is possible to decrease or prevent load imposed upon the entire battery by arranging a negative electrode as will be described later.

More specifically, in the battery 21 according to the embodiment of the present invention, the negative electrode 30 has an arrangement in which the active material layers 35 and 36 are formed on both surfaces of the first and second principal planes 34a and 34b of the negative electrode current collector 34 and in which the inner surface positive electrode active material layer 36 formed on the second principal plane 34b includes an alloyed region smaller than that of the outer surface positive electrode active material layer 35 formed on the first principal plane 34a, the alloyed region being formed between the first principal plane 34a and the current collector by a method as described later.

As the small alloyed region, there is provided an alloyed region with a small ratio at which metal materials have chemical bond at an interface portion between the active material and the current collector and which has a small volume of region in which components of metal materials are diffused to each other. Specifically, the negative electrode 30 has an arrangement in which the inner surface negative electrode active material layer 35 is formed as either a columnar negative electrode active material layer or a block-shaped negative electrode active material layer and in which the outer surface negative electrode active material layer 36 is formed as a powdery negative electrode active material layer, respectively. In the present application, areas which might not be alloyed may be contained in smaller alloyed regions.

It should be noted that a plurality of powdery active materials are frequently caused to gather and change into secondary particulate block shapes as a battery in which active material layers are made of materials with large expansion and contraction are charged and discharged. However, in the battery according to an embodiment of the present invention, the first negative electrode active material layer 35 has a columnar or block-shaped shape as a primary particulate block. Specifically, when the second negative electrode active material layer 36 formed on the second principal plane 34b is formed as a secondary particle block-shaped shape, a difference between the second principal plane 34b and the first negative electrode active material layer 35 can be observed from images obtained by a SEM (scanning electron microscope) and analyzed results obtained when miniscule areas were observed using scanning Auger microprobe.

Also, the first and second negative electrode active layers 35 and 36 constructing this negative electrode 30 may preferably contain oxygen (O) of content ranging of from 3 atomic % to 45 atomic % and they may have a multilayer structure formed by repeatedly laminating high oxygen concentration areas and low oxygen concentration areas along the direction substantially perpendicular to the first principal plane 34a.

Also, with respect to the surface roughness of the negative electrode current collector 34, it is preferable that roughness Ra of the principal plane on the side with high roughness may be greater than 0.2 μm. The reason for this is that, if the value of the roughness Ra is selected to be greater than 0.2 μm as described above, adhesion will be increased as will be described later on. However, when an extreme roughing treatment is carried out, even if roughness of both surfaces of the negative electrode current collector 34 is lowered to differ from each other, it is unavoidable that the negative electrode current collector 34 is either cracked or fractured. Therefore, it is considered that the value Ra the roughness of the principal plane with high roughness may preferably be selected to be less than 3.0 μm.

The first and second negative electrode active material layers 35 and 36 may be preferably formed by at least one method selected from a group consisting of a vapor-phase method, a liquid-phase method and a sintering method. Specifically, the reason for this is that this arrangement can suppress the battery from being destroyed as the first and second negative electrode active material layers 35 and 36 are expanded and contracted when the battery is charged and discharged and that the negative electrode current collector 34 and the first and second negative electrode active material layers 35 and 36 can be integrated to improve electron conductivity in the first and second negative electrode active material layers 35 and 36. Also, the binder and gaps can be decreased or removed so that the negative electrode 30 can be reduced in thickness.

The first and second negative electrode active material layers 35 and 36 may preferably be alloyed with the negative electrode current collector 34 at least on a part of the interface between them and the negative electrode current collector 34. Specifically, at the interface, elements of the negative electrode current collector 34 may preferably be diffused into the first and second negative electrode active material layers 35 and 36 or elements of the first and second negative electrode active material layers 35 and 36 may preferably be diffused into the negative electrode current collector 34 or those elements may preferably be diffused to each other. Although it is frequently observed that the alloying may take place simultaneously when the first and second negative electrode active material layers 35 and 36 are formed by the vapor-phase method, the liquid-phase method or the sintering method, the alloying may take place due to a further heat treatment. It should be noted that the above-mentioned diffusion of elements may be included in alloying in the application of the present invention.

It should be noted that the first and second negative electrode active material layers 35 and 36 may be formed by coating, specifically, negative electrode active materials and powder may optionally be bonded with a binder such as polyvinylidene fluoride.

In this case, powder of silicon (Si) or tin (Sn) compound may preferably have a primary particle diameter selected in a range of from 0.1 μm to 35 μm and more preferably the above primary particle diameter may be selected in a range of from 0.1 μm to 25 μm. If the particle diameter is smaller than this range, an undesired reaction occurs remarkably between the particle surface and an electrolytic solution, thereby deteriorating capacity or efficiency of the electrodes. If, on the other hand, the particle diameter is larger than this range, a reaction between it and lithium (Li) may not proceed within the particle, thereby decreasing the capacity of the electrodes. It should be noted that as a particle size measuring method, an observation method based on an optical microscope or electron microscope or laser diffraction method may be given, and it is preferable that the above observation method or the above laser diffraction method may be selectively used in response to the particle size region. It is also preferable that classification may be carried out to obtain a desired particle size. A classification method is not particularly limited, and a sieve or a wind power classifier may be used in a dry method or a wet method.

It should be noted that powder of the individual element or compound of silicon (Si) or tin (Sn) can be manufactured by a related-art method used in a powder metallurgy and the like. Examples of the related-art method include a method in which a raw material is melted by a melting furnace such as an arc smelting furnace and a high-frequency induced heating furnace, cooled and ground, a method of quenching a melted metal of a raw material such as a single roll quenching method, a twin-roll quenching method, a gas atomizing method, a water atomizing method or a centrifugal atomizing method and a method in which a melted metal of a raw material is solidified by a cooling method such as a single roll quenching method and a twin-roll quenching method and ground by a suitable method such as a mechanical alloying method. In particular, it is preferable that the gas atomizing method or the mechanical alloying method may be used. It should be noted that these synthesis and grinding may preferably be carried out in the inert gas atmosphere such as argon (Ar) gas, nitrogen (N) gas or helium (H) gas or in vacuum atmosphere in order to prevent metals from being oxidized by oxygen (O) in the air.

The separators 27 and 28 may isolate the positive electrode 29 and the negative electrode 30 from each other and may permeate lithium (Li) ions while preventing an electric current from being short-circuit when both electrodes 29 and 30 contact with each other, and may be formed of a porous polyolefin film such as a polyethylene film or a polypropylene film. For maintaining safety, it is preferable that the separators 27 and 28 may have a function to close the pores by hot-melting at a temperature higher than a predetermined temperature (for example, 120° C.), thereby increasing resistance to shut off an electric current.

In the embodiment according to the present invention, the separators 27 and 28 are impregnated with an electrolytic solution (not shown). The electrolytic solution may contain a solvent and an electrolytic salt dissolved into the solvent, and a solvent and an electrolytic salt may optionally contain various kinds of additives.

Examples of the solvents include propylene carbonate, ethylene carbonate, diethyl carbonate, methyl ethyl carbonate, 1,2-dimethoxy ethane, 1,2-diethoxy ethane, γ-butyrolactone, tetrahydrofuran, 2-methyl tetrahydrofuran, 1,3-dioxolane, 4-methyl-1,3-dioxolane, diethyl ether, sulfolane, methyl sulfolane, acetonitrile, propylnitrile, anisole, acetic ester or propionic acid ester. The above additives may be used alone or a combination of tow or more.

The preferable examples of the electrolytic salt include $LiClO_4$, $LiAsF_6$, $LiPF_6$, $LiBF_4$, $LiCH_3SO_3$, $LiCF_3SO_3$, $LiN(CF_3SO_2)_2$, $LiN(C_2F_5SO_2)_2$, $LiN(C_4F_9SO_2)(CF_3SO_2)$, $LiCl$ or $LiBr$. Of these electrolytic salts, $LiClO_4$, $LiAsF_6$, $LiPF_6$, $LiBF_4$, $LiCH_3SO_3$, $LiCF_3SO_3$, $LiN(CF_3SO_2)_2$, $LiN(C_2F_5SO_2)_2$ or $LiN(C_4F_9SO_2)(CF_3SO_2)$ may be preferable; with $LiPF_6$ or $LiBF_4$ being particularly preferable. The above electrolytic salts may either be used alone or a combination of two or more.

Embodiment 3

A battery according to a third embodiment of the present invention will be described.

Figure 3:
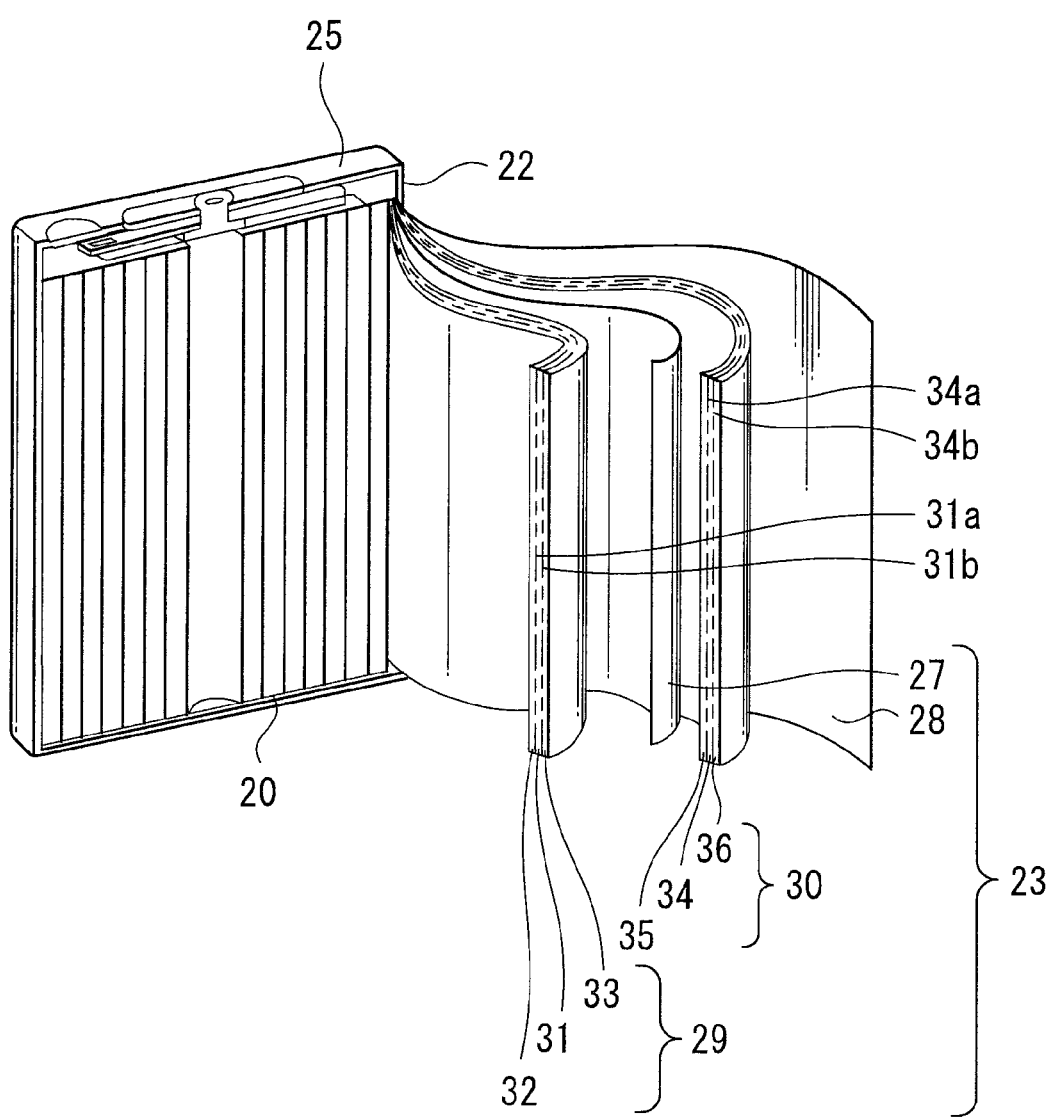
FIG. 3 is a schematic perspective view showing still another example of a partially sectioned battery configuration according to an embodiment of the present invention.

In this embodiment, a battery of a type different from the first embodiment will be described with reference to an element winding type rectangular battery shown by a partially sectioned perspective view of FIG. 3. In FIG. 3, elements and parts identical to those of FIG. 2 are denoted by identical reference numerals and details are therefore omitted.

As shown in FIG. 3, the battery 21 according to the embodiment of the present invention includes the rectangular battery can 22 with its upper surface opened in which the electrode winding body 23 is located and sealed by the battery lid 25.

The battery can 22 is made of a nickel-plated iron, and the electrode winding body 23 has an arrangement in which the positive electrode 29 and the negative electrode 30 similarly wound are located in an opposing fashion through a pair of wound separators 27 and 28 containing an electrolyte.

The battery lid 25 includes the safety valve mechanism 38 with a heat sensitive resistance element (PTC element, not shown) incorporated therein, and attached to the battery can 22 when caulked through gaskets (not shown) and the like. That is, the inside of the battery 21 is hermetically closed by the battery can 22 and the battery lid 25.

The safety valve mechanism 38 is electrically connected to the battery lid 25 through the PTC element. When an internal pressure of the battery 21 is increased to be higher than a constant value due to inside short-circuit or applying heat from outside, an incorporated disk plate is inverted to disconnect electric connection between the battery lid 25 and the electrode winding body 23. The PTC element may prevent abnormal heat due to a large electric current by increasing resistance limiting electric current increase by when a temperature rises.

In the embodiment according to the present invention, the electrode winding body 23 has an arrangement in which the strip-shape (thin plate-shaped) positive and negative electrodes 29 and 30 are located in an opposing fashion through the separators 27 and 28 containing an electrolyte, these positive electrode 29 and negative electrode 30 being wound around the electrode winding body 23.

It should be noted that the electrode winding body 23 is shaped like an ellipse having a curved portion (non-bending curved portion) within the long and narrow battery can 22.

A positive lead wire made of aluminum (Al), for example, and a negative lead wire made of nickel (Ni) and the like (not shown) are respectively connected to the positive electrode 29 and the negative electrode 30 of the electrode winding body 23. A positive lead wire is welded to the safety valve mechanism 38 and thereby electrically connected to the battery lid 25, and the negative lead wire is directly welded to the battery can 22 and thereby electrically connected thereto.

The positive electrode 29 includes a positive electrode current collector 31 including a first principal plane 31a corresponding to an inner surface in the winding structure and a second principal plane 31b corresponding to an outer surface where a first positive electrode active material layer 32 is supported at the side of the first principal plane 31a and a second positive electrode active material layer 33 is supported at the side of the second principal plane 31b.

Both of the first and second positive electrode active material layers 32 and 33 need not always be provided and they may preferably be selected and formed in response to target battery arrangement and characteristics. The positive electrode current collector 31 may be made of aluminum (Al), nickel (Ni) or stainless steel, for example.

The first and second positive electrode active material layers 32 and 33 may contain a positive electrode active material and may contain a conductivity assisting agent such as a carbonaceous material and a binder such as polyvinylidene fluoride if necessary. Lithium containing metal composite oxide shown by a general formula $Li_xMO_2$, for example, may preferably be used as the positive electrode active material because the lithium containing metal composite oxide is able to generate a high voltage and it is high in density so that it can make the secondary battery become higher in capacity. It should be noted that M is at least one type of transition metal and it may be at least one kind selected from a group consisting of cobalt (Co), nickel (Ni) and manganese (Mn). The x may differ depending on the battery charging and discharging states and it is a value generally selected in a range of $0.05 \leq x \leq 1.10$. $LiCoO_2$ or $LiNiO_2$ and the like may be enumerated as specific examples of such lithium containing metal composite oxide. It should be noted that the positive electrode active material may use any one kind of lithium containing metal composite oxides and that it may mix more than two kinds of lithium containing metal composite oxides.

On the other hand, the negative electrode 30 includes a negative electrode current collector 34 having a first principal plane 34a corresponding to an inner surface in the winding structure and a second principal plane 34b corresponding to an outer surface and in which a first negative electrode active material layer 35 is supported at the side of the first principal plane 34a and a second negative electrode active material layer 36 is supported at the side of the second principal plane 34b.

It should be noted that both of the first and second negative electrode active material layers 35 and 36 need not always be provided as will be described later on.

The negative electrode current collector 34 may preferably be made of copper (Cu), stainless steel, nickel (Ni), titanium (Ti), tungsten (W), molybdenum (Mo) or aluminum (Al) and more preferably, may be made of a metal which is easy to be alloyed with the first and second negative electrode active material layers 35 and 36. For example, when the first and second negative electrode active material layers 35 and 36 contain at least one kind of the individual elements or compounds selected from the group consisting of silicon (Si) and tin (Sn) as will be described later. As examples of the materials which are easy to be alloyed with the first and second negative electrode active material layers 35 and 36, copper (Cu), titanium (Ti), aluminum (Al) or nickel (Ni) may be given. It should be noted that the negative electrode active current collector 14 may be formed of either a single layer or a plurality of layers. In that case, the layers which contact with the first and second negative electrode active material layers 35 and 36 may be made of metal materials that are easy to be alloyed with the first and second negative electrode active material layers 35 and 36 and other layers may be made of other metal materials.

The first and second negative electrode active material layers 35 and 36 may contain at least one kind selected from a group consisting of individual elements and compounds of metal elements or semimetal elements which can be alloyed with lithium (Li) because they can generate high energy density.

Examples of such metal elements or semimetal elements (Pd) include platinum (Pt), zinc (Zn), cadmium (Cd), mercury (Hg), aluminum (Al), indium (In), silicon (Si), germanium (Ge), tin (Sn), lead (Pb), arsenic (As), antimony (Sb) or bismuth (Bi). As examples of these compounds mentioned above, the compounds shown by a chemical formula $Ma_sMb_t$ may be given. In this chemical formula, Ma represents at least one kind of metal elements and semimetal elements which can be alloyed with lithium (Li), and Mb represents at least one kind of elements other than Ma. The value s is $s>0$ and the value t is $t \geq 0$, respectively.

Of these metal elements and semimetal elements, individual elements or compounds of silicon (Si), germanium (Ge), tin (Sn) or lead (Pb) may be preferable, and particularly preferable metal elements and semimetal elements are individual elements of the aforementioned silicon (Si) or tin (Sn) or compounds thereof. The individual element and the compound of silicon (Si) or tin (Sn) have large ability to insert and extract lithium (Li) to increase energy density of the negative electrode 30 depending on a combination thereof. It should be noted that the compound of silicon (Si) and tin (Sn) may either be crystal or amorphous and may preferably be made of a polymer of amorphous or microcrystal. The amorphous or microcrystal may have a pattern in which a half width of a peak of a diffraction pattern obtained by X-ray diffraction analysis using CuKα as characteristic X-rays is higher than 0.5° at 2θ and may also have a broad pattern in which a half width ranges of from 30° to 60° at 2θ.

Examples of the compound of silicon (Si) and tin (Sn) include $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v\leq 2$), $SnO_w$ ($0<w\leq 2$), $SnSiO_3$, LiSiO or LiSnO.

Some of high capacity active materials that may form the first and second negative electrode active material layer 35 and 36 of the negative electrode 30 may drastically change the volume when the battery is charged and discharged as described earlier. In particular, if the high capacity active material contains silicon (Si) or tin (Sn), when the active material layer is thin, its volume may change considerably to peel off the layer from the interface of the current collector and to apply stress to the entire inside of the battery when the battery is charged and discharged, thereby further causing the electrode to be either cracked or fractured. According to the arrangement of the battery of the embodiment of the present invention, it is possible to decrease or prevent a load imposed upon the entire battery by an arrangement of a negative electrode as will be described later.

More specifically, in the battery 21 according to the embodiment of the present invention, the negative electrode 30 is formed such that the active material layers 35 and 36 are formed on both surfaces of the first and second principal planes 34a and 34b of the negative electrode current collector 34, and the inner surface positive electrode active material layer 36 formed on the second principal plane 34b has an alloyed region smaller than the outer surface positive electrode active material layer 35 formed on the first principal plane 34a between the first principal plane 34a and the current collector.

Here, as the small alloyed region, there may be enumerated an alloyed region with a small ratio at which metal materials have chemical bond at an interface portion between the active material and the current collector and which has a small volume of region in which components of metal materials are diffused to each other. Specifically, the negative electrode 30 has an arrangement in which the inner surface negative electrode active material layer 35 is formed as either a columnar negative electrode active material layer or a block-shaped negative electrode active material layer and in which the outer surface negative electrode active material layer 36 is formed as a powdery negative electrode active material layer, respectively. In the present application, areas which might not be alloyed may be contained in smaller alloyed regions.

It should be noted that a plurality of powdery active materials are frequently caused to gather and change into secondary particulate block shapes as a battery in which active material layers are made of materials with large expansion and contraction are charged and discharged. However, in the battery according to the embodiment of the present invention, the first negative electrode active material layer 35 has a columnar or block-shaped shape as a primary particulate block. Specifically, in the battery according to the embodiment of the present invention, even when the second negative electrode active material layer 36 formed on the second principal plane 34b is formed as a secondary particle block-shaped shape, a difference between it and the first negative electrode active material layer 35 can be visually confirmed by observed images obtained from a SEM (scanning electron microscope) and analyzed results obtained when miniscule areas were observed by scanning Auger microprobe.

Further, the first and second negative electrode active layers 35 and 36 forming the negative electrode 30 may preferably contain oxygen (O) of content ranging of from 3 atomic % to 45 atomic % and they may have a multilayer structure formed by repeatedly laminating high oxygen concentration areas and low oxygen concentration areas along the direction substantially perpendicular to the first principal plane 34a.

Also, with respect to the surface roughness of the negative electrode current collector 34, it is preferable that roughness Ra of the principal plane on the side with high roughness may be greater than 0.2 μm. The reason for this is that, if the value of the roughness Ra is selected to be greater than 0.2 μm as described above, adhesion will be increased as will be described later on. However, when an extreme roughing treatment is carried out, even if roughness of both surfaces of the negative electrode current collector 34 is lowered to differ from each other, it is unavoidable that the negative electrode current collector 34 is either cracked or fractured. Therefore, it is considered that the value of the roughness Ra of the principal plane with high roughness may preferably be selected to be less than 3.0 μm.

It should be noted that the first and second negative electrode active material layers 35 and 36 may be preferably formed by at least one method selected from a group consisting of a vapor-phase method, a liquid-phase method and a sintering method. Specifically, the reason for this is that this arrangement can suppress more reliably the battery from being destroyed as the first and second negative electrode active material layers 35 and 36 are expanded and contracted when the battery is charged and discharged and that the negative electrode current collector 34 and the first and second negative electrode active material layers 35 and 36 can be integrated to improve electron conductivity in the first and second negative electrode active material layers 35 and 36.

Also, the binder and gaps can be decreased or removed so that the negative electrode 30 can be reduced in thickness.

Here, the baking method means a method of forming a denser layer with a higher volume density than that obtained before heat treatment by heat treatment on the molded layer of the mixture of powder containing the active material and the binder under non-oxidizing atmosphere.

The first and second negative electrode active material layers 35 and 36 may preferably be alloyed with the negative electrode current collector 34 at least on one part of the interface between the first and second negative electrode active material layers 35 and 36 and the negative electrode current collector 34. Specifically, at the interface, elements of the negative electrode current collector 34 may preferably be diffused into the first and second negative electrode active material layers 35 and 36 or elements of the first and second negative electrode active material layers 35 and 36 may preferably be diffused into the negative electrode current collector 34 or the elements may preferably be diffused to each other. Although it is frequently observed that simultaneously occurring alloying when the first and second negative electrode active material layers 35 and 36 are formed by the vapor-phase method, the liquid-phase method or the sintering method, the alloying may occur due to a further heat treatment. It should be noted that the above-mentioned diffusion of elements may be included in alloying in the application of the present invention.

Further, It should be noted that the first and second negative electrode active material layers 35 and 36 may be formed by coating, specifically, negative electrode active materials and powder may optionally be bonded with a binder such as polyvinylidene fluoride.

In this case, it is preferable that powder of silicon (Si) or tin (Sn) compound may preferably have a primary particle diameter selected within a range of from 0.1 μm to 35 μm, and more preferably, within a range of from 0.1 μm to 25 μm. If the particle diameter is smaller than this range, an undesired reaction may remarkably be observed between the particle surface and an electrolytic solution, thereby deteriorating capacity or efficiency of the electrodes. If, on the other hand, the particle diameter is larger than this range, a reaction between it and lithium (Li) may not proceed within a particle, thereby reducing the capacity of the electrodes. As examples of the particle size measuring method, an observation method based on an optical microscope or electron microscope or laser diffraction method may be given. It is preferable that the above observation method or the above laser diffraction method be selectively used in response to the particle size regions. It is preferable that classification may be carried out to obtain a desired particle size. A classification method is not particularly limited, and a sieve or a wind power classifier may be used in a dry method or a wet method.

It should be noted that powder of the individual element or compound of silicon (Si) or tin (Sn) can be prepared by a related-art method used in a powder metallurgy and the like. As examples of the related-art method, a method where a raw material is melted by a melting furnace such as an arc smelting furnace and a high-frequency induced heating furnace, cooled and ground, a method of quenching a melted metal of a raw material such as a single roll quenching method, a twin-roll quenching method, a gas atomizing method, a water atomizing method or a centrifugal atomizing method and a method where a melted metal of a raw material is solidified by a cooling method such as a single roll quenching method and a twin-roll quenching method, and then ground by a suitable method such as a mechanical alloying method. In particular, it is preferable that the gas atomizing method or the mechanical alloying method may be used. It should be noted that these synthesis and grinding may preferably be carried out under inert gas atmosphere such as argon (Ar) gas, nitrogen (N) gas or helium (He) gas atmospheres or in vacuum to prevent metals from being oxidized by oxygen in the air.

The separators 27, 28 may isolate the positive electrode 29 and the negative electrode 30 from each other which may permeate lithium (Li) ions while preventing an electric current from being short-circuit when both of the electrodes 29 and 30 contact with each other. The separators 27, 28 may be formed of a micro-porous polyolefin film such as a polyethylene film or a polypropylene film, for example. In order to maintain safety, it is preferable that the separators 27, 28 may have a function to close the pores by hot-melting at a temperature higher than a predetermined temperature (for example, 120° C.) to increase resistance so that an electric current may be shut off.

The separators 27 and 28 are impregnated with an electrolytic solution (not shown). This electrolytic solution may contain a solvent and an electrolytic salt dissolved into the solvent, which may optionally contain various types of additives.

Examples of the solvents include propylene carbonate, ethylene carbonate, diethyl carbonate, methyl ethyl carbonate, 1,2-dimethoxy ethane, 1,2-diethoxy ethane, γ-butyrolactone, tetrahydrofuran, 2-methyl tetrahydrofuran, 1,3-dioxolane, 4-methyl-1,3-dioxolane, diethyl ether, sulfolane, methyl sulfolane, acetonitrile, propylnitrile, anisole, acetic ester or propionic acid ester. The above additives may be used alone or a combination of two or more.

Examples of the electrolytic salt include $LiClO_4$, $LiAsF_6$, $LiPF_6$, $LiBF_4$, $LiCH_3SO_3$, $LiCF_3SO_3$, $LiN(CF_3SO_2)_2$, $LiN(C_2F_5SO_2)_2$, $LiN(C_4F_9SO_2)$ $(CF_3SO_2)$, LiCl or LiBr. Of these electrolytic salts, $LiClO_4$, $LiAsF_6$, $LiPF_6$, $LiBF_4$, $LiCH_3SO_3$, $LiCF_3SO_3$, $LiN(CF_3SO_2)_2$, $LiN(C_2F_5SO_2)_2$ or $LiN(C_4F_9SO_2)$ $(CF_3SO_2)$ may be preferable. Of these electrolytic salts, $LiPF_6$ or $LiBF_4$ may be particularly preferable. The above electrolytic salts may be used alone or a combination of two or more.

EXAMPLES

Results obtained when characteristics of the battery having the aforementioned arrangement according to the first embodiment of the present invention were measured will hereinafter be described in detail with reference to the drawings as specific examples of the present invention. In the following examples, reference numerals and symbols used in the aforementioned first embodiment denote identical elements and parts.

Cycle characteristics of the battery were measured. Specifically, the battery was charged with a constant current and a constant voltage at a current of 500 mA and an upper limit voltage of 4.2 V at a room temperature and the battery was discharged with a constant current at a lower limit voltage of 2.5 V during 50 cycles, and (discharge capacity of 50th cycle/discharge capacity of first cycle)×100(%) was measured as a ratio of a discharge capacity of 50th cycle relative to a discharge capacity of first cycle.

It should be noted that lithium carbonate ($Li_2CO_3$) and cobalt oxide ($CO_3O_4$) was mixed in a mortar in a Li and Co weight ratio of 1:1, a mixture was baked at 880° C. in the air for 12 hours, rinsed by water, the resultant positive electrode active material was coated on the positive electrode current collector and thereby fabricated as a positive electrode and that this positive electrode was used. Also, with respect to surface densities of positive electrodes according to the respective examples, negative electrode capacities of one side of the corresponding negative electrodes were evaluated by coin cells of opposing electrode lithium and surface densities were adjusted based on evaluated results so that a negative electrode utilization factor may reach 80%.

Also, in all of the examples, a 20 μm-thick polyethylene separator was used as the separator and a solvent obtained by mixing ethylene carbonate and diethyl carbonate in the weight ratio of 4:6 was used as an electrolyte (electrolytic solution). In the examples except the fifth example, a solvent in which $LiPF_6$ was further dissolved into the above solvent at a concentration of 1 $mol/dm^3$ was used as the solvent.

Example 1

Example 1 will be described with reference to TABLE 1.

First, fabrication of negative electrodes in the example will be described.

As is clear from examples 1-1 to 1-3 in the TABLE 1, three types of negative electrodes were formed, and batteries including the respective negative electrodes were measured.

In the first type negative electrode, electrolytic copper foil having a thickness of 15 μm was used as a negative electrode current collector. A 6 μm-thick silicon was deposited on the first principal plane of the negative electrode current collector by electron-beam evaporation. Artificial graphite having a mean particle diameter of 12 μm and PVdF were mixed at a weight ratio (wt %) of 95:5. The mixture was dissolved into NMP to prepare slurries. The resultant slurries were coated on the current collector, dried, molded with pressure, and fabricated as a negative electrode on the second principal plane of the negative electrode current collector.

In the second type negative electrode, after silicon (Si) was deposited on the first principal plane in the same manner as the first type negative electrode, silicon powder having a mean particle diameter of 3 μm, artificial graphite having a mean particle diameter of 6 μm and PVdF were mixed at a weight ratio (wt %) of 70:20:10. The mixture was dissolved into the NMP to prepare slurries. After the slurries were coated on the current collector, the resultant slurries were dried, molded with pressure and fabricated as the negative electrode on the second principal plane of the negative electrode current collector.

In third type negative electrode, after silicon (Si) was deposited on the first principal plane in the same manner as the first type negative electrode, a tin compound having a mean particle diameter of 10 μm that includes a composition with the percentage of the atomic number of Sn:Co:Cu=40:40:20 prepared by gas atomizing, artificial graphite having a mean particle diameter of 6 μm and PVdF were mixed in a weight ratio of 30:60:10 was dissolved into the NMP to prepare slurries. After the slurries were coated on the current collector, the resultant slurries were dried, molded with pressure and fabricated as the negative electrode on the second principal plane of the negative electrode current collector.

It should be noted that a negative electrode in which silicon (Si) was deposited only on the first principal plane by vapor deposition and a negative electrode in which silicon (Si) was deposited both on the first and second principal planes by vapor deposition were prepared as comparative examples, characteristics thereof being compared with each other.

Winding type batteries including the aforementioned laminated films described in the first embodiment as exterior members thereof were formed, and rates of discharge capacity retention were measured. Measured results are shown in the following TABLE 1.

TABLE 1

| | 1st principal plane Active material layer | | 2nd principal plane Active material layer | | Surface Roughness Ra(μm) of Negative Electrode Current Collector | Electrolyte composition | Discharge Capacity Retention Rate (%) |
|---|---|---|---|---|---|---|---|
| | Material | Film Thickness (μm) | Material | Film Thickness (μm) | | | |
| Example 1-1 | Vapor-deposited Si | 6 | Artificial Graphite (Gr) | | 0.5 | EC:DEC = 40:60 | 91 |
| Example 1-2 | Vapor-deposited Si | 6 | Gr + Si | | 0.5 | EC:DEC = 40:60 | 85 |
| Example 1-3 | Vapor-deposited Si | 6 | Gr + Sn | | 0.5 | EC:DEC = 40:60 | 80 |
| Comparative Example 1-1 | Vapor-deposited Si | 6 | none | | 0.5 | EC:DEC = 40:60 | 69 |
| Comparative Example 1-2 | Vapor-deposited Si | 6 | Vapor-deposited Si | 6 | 0.5 | EC:DEC = 40:60 | 65 |

TABLE 1 shows the arrangement of the battery including the Si deposited active material layer formed only on the first principal plane (i.e., only on one-side surface) as well as including the active material layer having the relatively small alloyed region with the current collector formed on the second principal plane exhibits extremely higher discharge capacity retention rate as compared to any one of the arrangement with the Si deposited active material layers formed on both surfaces of the first and second principal planes and the arrangement without the active material layer formed on the second principal plane.

Example 2

Example 2 will be described with reference to TABLE 2.
In the example, a negative electrode was formed such that a 6 μm-thick silicon was deposited on the first principal plane of a negative current collector formed of a 15 μm-thick electrolytic copper foil by electron beam deposition and that artificial graphite with a mean particle diameter of 12 μm and PVd were mixed in the weight ratio (wt %) of 95:5, and the mixture was dissolved into NMP to prepare slurries. After the slurries were coated on the current collector, the slurries are dried, molded with pressure and manufactured on the second principal plane as the negative electrode.

Further, in this embodiment, characteristics obtained when surface roughness of the copper foil corresponding to the negative current collector was changed were examined.

The winding type batteries including the aforementioned laminated film described in the first example as the exterior members are formed by using the above negative electrodes, and rates of discharge capacity retention were measured. Measured results are shown in the following TABLE 2.

TABLE 2

| | 1st principal plane Active material layer | | 2nd principal plane Active material layer | | Surface Roughness Ra(μm) of Negative Electrode Current Collector | Electrolyte composition | Discharge Capacity Retention Rate (%) |
|---|---|---|---|---|---|---|---|
| | material | Film Thickness (μm) | material | Film Thickness (μm) | | | |
| Example 2-1 | Vapor-deposited Si | 6 | Gr + Si | | 0.1 | EC:DEC = 40:60 | 73 |
| Example 2-2 | Vapor-deposited Si | 6 | Gr + Si | | 0.2 | EC:DEC = 40:60 | 80 |
| Example 2-3 | Vapor-deposited Si | 6 | Gr + Si | | 0.5 | EC:DEC = 40:60 | 85 |
| Example 2-4 | Vapor-deposited Si | 6 | Gr + Si | | 0.9 | EC:DEC = 40:60 | 86 |
| Example 2-5 | Vapor-deposited Si | 6 | Gr + Si | | 1.5 | EC:DEC = 40:60 | 87 |
| Example 2-6 | Vapor-deposited Si | 6 | Gr + Si | | 2.8 | EC:DEC = 40:60 | 86 |

TABLE 2-continued

|  | 1st principal plane Active material layer | | 2nd principal plane Active material layer | | Surface Roughness Ra(μm) of Negative Electrode Current Collector | Electrolyte composition | Discharge Capacity Retention Rate (%) |
|---|---|---|---|---|---|---|---|
|  | material | Film Thickness (μm) | material | Film Thickness (μm) | | | |
| Example 2-7 | Vapor-deposited Si | 6 | Gr + Si | | 4.2 | EC:DEC = 40:60 | 84 |
| Example 2-8 | Vapor-deposited Si | 6 | Gr + Si | | 5.5 | EC:DEC = 40:60 | 81 |

TABLE 2 shows that of the arrangement having the Si deposited active material layer formed only on the first principal plane (i.e., only on one-side surface) as well as having the active material layer with the relatively small alloyed region with the current collector formed on the second principal plane, the arrangement having the surface roughness of the current collector of equal to or larger than 0.2 μm particularly exhibits higher rates of discharge capacity retention.

Example 3

Example 3 will be described with reference to TABLE 3.

In the example, the negative electrode was formed such that the aforementioned deposited film of the first example was formed by introducing oxygen gas diluted by argon gas to form an oxygen containing active material layer and that the negative electrode was formed while an atomic ratio between Si (silicon) atoms and O (oxygen) atoms in the deposited film was changed.

The winding type batteries including the aforementioned laminated film described in the first example were formed by using the negative electrodes, and rates of discharge capacity retention were measured. Measured results are shown in the following TABLE 3.

TABLE 3

|  | 1st principal layer Active Material layer | | | 2nd principal layer Active material layer | | Surface Roughness Ra(μm) of Negative Electrode Current Collector | Electrolyte Composition | Discharge Capacity Retention Rate (%) |
|---|---|---|---|---|---|---|---|---|
|  | Material | Film Thickness (μm) | SiO | Material | Film Thickness (μm) | | | |
| Example 3-1 | Vapor-deposited Si | 6 | 99:1 | Gr + Si | | 0.5 | EC:DEC = 40:60 | 73 |
| Example 3-2 | Vapor-deposited Si | 6 | 97:3 | Gr + Si | | 0.5 | EC:DEC = 40:60 | 80 |
| Example 3-3 | Vapor-deposited Si | 6 | 95:5 | Gr + Si | | 0.5 | EC:DEC = 40:60 | 85 |
| Example 3-4 | Vapor-deposited Si | 6 | 90:10 | Gr + Si | | 0.5 | EC:DEC = 40:60 | 87 |
| Example 3-5 | Vapor-deposited Si | 6 | 81:19 | Gr + Si | | 0.5 | EC:DEC = 40:60 | 84 |
| Example 3-6 | Vapor-deposited Si | 6 | 67:33 | Gr + Si | | 0.5 | EC:DEC = 40:60 | 81 |
| Example 3-7 | Vapor-deposited Si | 6 | 55:45 | Gr + Si | | 0.5 | EC:DEC = 40:60 | 77 |
| Example 3-8 | Vapor-deposited Si | 6 | 40:60 | Gr + Si | | 0.5 | EC:DEC = 40:60 | 71 |

TABLE 3 shows that of the arrangement having the Si deposited active material layer formed only on the first principal plane (i.e., only on one-side surface) as well as having the active material layer with the relatively small alloyed region with the current collector formed on the second principal plane, the arrangement where a ratio of oxygen (O) in silicon ($SiO_x$) that is partly oxidized within the active material layer formed on the first principal plane falls within a range of from 3 atomic % to 45 atomic % exhibits higher rates of discharge capacity retention.

Example 4

Example 4 will be described with reference to TABLE 4.

In the example, a negative electrode was formed such that after an Si (silicon) film having a predetermined thickness (X μm) was deposited by electron beam deposition, oxygen (O) gas diluted by argon (Ar) gas was introduced into a chamber to oxidize the portion near the surface of the active material layer, then introduction of oxygen was stopped and a Si (silicon) film having a similar thickness was deposited again. The above-mentioned steps were repeated to deposit a silicon active material layer with a total thickness of 6 μm, thereby forming a negative electrode. Specifically, in the example, the total number of laminated layers of the negative active material layer is 6/X layers. It should be noted that the concentration of oxygen (O) relative to silicon (Si) was adjusted to reach approximately 10% of all the negative electrode arrangements.

The winding type batteries including the aforementioned laminated film described in the first example were formed by using these electrodes, and rates of discharge capacity retention were measured. Measured results are shown in the following TABLE 4.

TABLE 4 shows that of the arrangement having the Si deposited active material layer formed only on the first principal plane (i.e., only on one-side surface) as well as having the active material layer with the relatively small alloyed region with the current collector formed on the second principal plane, the arrangement where the number of layers in the multilayer structure including the high concentration regions and the low concentration regions repeatedly formed in the direction approximately perpendicular to the first principal plane falls within a range of from 2 to 10 exhibits higher rates of discharge capacity retention.

Example 5

Example 5 will be described with reference to a [TABLE 5].

In the example, a negative electrode having an inner surface negative electrode active material layer deposited on the first principal plane by Si deposition and a negative electrode having an outer surface negative electrode active material layer formed on the second principal plane by the aforementioned slurry coating were used and rates of discharge capacity retention were measured while mixing ratios of solvents and additives were changed in the composition of the electrolyte. Measured results are shown in the following TABLE 5.

TABLE 4

| | 1st principal layer Active Material layer | | | 2nd principal layer Active material layer | | Surface Roughness Ra(μm) of Negative Electrode Current Collector | Electrolyte Composition | Discharge Capacity Retention Rate (%) |
|---|---|---|---|---|---|---|---|---|
| | Material | Film Thickness (μm) | X | Material | Film Thickness (μm) | | | |
| Example 4-1 | Vapor-deposited Si | 6 | 1 | Gr + Si | | 0.5 | EC:DEC = 40:60 | 87 |
| Example 4-2 | Vapor-deposited Si | 6 | 2 | Gr + Si | | 0.5 | EC:DEC = 40:60 | 88 |
| Example 4-3 | Vapor-deposited Si | 6 | 5 | Gr + Si | | 0.5 | EC:DEC = 40:60 | 90 |
| Example 4-4 | Vapor-deposited Si | 6 | 10 | Gr + Si | | 0.5 | EC:DEC = 40:60 | 89 |
| Example 4-5 | Vapor-deposited Si | 6 | 15 | Gr + Si | | 0.5 | EC:DEC = 40:60 | 88 |

TABLE 5

| | 1st principal plane Active material layer | | 2nd principal plane Active material layer | | Surface Roughness Ra(μm) of Negative Electrode Current Collector | Electrolyte composition | | discharge capacity retention rate (%) |
|---|---|---|---|---|---|---|---|---|
| | Material | Film Thickness (μm) | Material | Film Thickness (μm) | | solvent | additive | |
| Example 5-1 | Vapor-deposited Si | 6 | Gr + Si | | 0.5 | EC:DEC = 40:60 | | 85 |
| Example 5-2 | Vapor-deposited Si | 6 | Gr + Si | | 0.5 | EC:DEC = 40:60 | PS 0.5% | 86 |
| Example 5-3 | Vapor-deposited Si | 6 | Gr + Si | | 0.5 | EC:DEC = 40:60 | PS 3% | 87 |
| Example 5-4 | Vapor-deposited Si | 6 | Gr + Si | | 0.5 | EC:DEC = 40:60 | PS 6% | 87 |
| Example 5-5 | Vapor-deposited Si | 6 | Gr + Si | | 0.5 | EC:DEC = 40:60 | PS 10% | 86 |
| Example 5-6 | Vapor-deposited Si | 6 | Gr + Si | | 0.5 | EC:DEC = 40:60 | PRS 0.5% | 87 |
| Example 5-7 | Vapor-deposited Si | 6 | Gr + Si | | 0.5 | EC:DEC = 40:60 | PRS 3% | 89 |
| Example 5-8 | Vapor-deposited Si | 6 | Gr + Si | | 0.5 | EC:DEC = 40:60 | PRS 6% | 88 |
| Example 5-9 | Vapor-deposited Si | 6 | Gr + Si | | 0.5 | EC:DEC = 40:60 | PRS 10% | 87 |
| Example 5-10 | Vapor-deposited Si | 6 | Gr + Si | | 0.5 | EC:DEC = 40:60 | VEC 5% | 86 |
| Example 5-11 | Vapor-deposited Si | 6 | Gr + Si | | 0.5 | EC:DEC = 40:60 | VEC 10% | 86 |
| Example 5-12 | Vapor-deposited Si | 6 | Gr + Si | | 0.5 | EC:DEC = 40:60 | VEC 20% | 87 |
| Example 5-13 | Vapor-deposited Si | 6 | Gr + Si | | 0.5 | EC:DEC = 40:60 | VEC 30% | 86 |
| Example 5-14 | Vapor-deposited Si | 6 | Gr + Si | | 0.5 | EC:DEC = 40:60 | VC 2% | 88 |
| Example 5-15 | Vapor-deposited Si | 6 | Gr + Si | | 0.5 | EC:DEC = 40:60 | VC 4% | 89 |
| Example 5-16 | Vapor-deposited Si | 6 | Gr + Si | | 0.5 | EC:DEC = 40:60 | VC 10% | 90 |
| Example 5-17 | Vapor-deposited Si | 6 | Gr + Si | | 0.5 | EC:DEC = 40:60 | VC 20% | 88 |
| Example 5-18 | Vapor-deposited Si | 6 | Gr + Si | | 0.5 | FEC:DEC = 20:80 | | 88 |
| Example 5-19 | Vapor-deposited Si | 6 | Gr + Si | | 0.5 | FEC:DEC = 40:60 | | 90 |
| Example 5-20 | Vapor-deposited Si | 6 | Gr + Si | | 0.5 | FEC:DEC = 40:60 | PRS 3% | 93 |
| Example 5-21 | Vapor-deposited Si | 6 | Gr + Si | | 0.5 | FEC:DEC = 40:60 | VC 4% | 94 |
| Example 5-22 | Vapor-deposited Si | 6 | Gr + Si | | 0.5 | FEC:DEC = 40:60 | PRS 3%, VC 4% | 96 |
| Example 5-23 | Vapor-deposited Si | 6 | Gr + Si | | 0.5 | EC:DEC = 40:60 | $0.8MLiPF_8$, $02MLiBF_4$ | 88 |

TABLE 5-continued

| | 1st principal plane Active material layer | | 2nd principal plane Active material layer | | Surface Roughness Ra(μm) of Negative Electrode Current Collector | Electrolyte composition | | discharge capacity retention rate (%) |
|---|---|---|---|---|---|---|---|---|
| | Material | Film Thickness (μm) | Material | Film Thickness (μm) | | solvent | additive | |
| Example 5-24 | Vapor-deposited Si | 6 | Gr + Si | | 0.5 | EC:DEC = 40:60 | 0.8MLiPF$_8$, 0.2MLBF$_4$, PRS 3% | 91 |

TABLE 5 shows that the arrangement having the Si deposited active material layer formed only on the first principal plane (i.e., only on one-side surface) as well as having the active material layer with the relatively small alloyed region with the current collector formed on the second principal plane can exhibits higher rates of discharge capacity retention if the electrolytic solution was formed by adding predetermined additives regardless of the compositions of the solvents forming the battery.

Example 6

Example 6 will be described with reference to a TABLE 6.

In the example, when negative electrodes were formed, silicon powder having a mean particle diameter of 3 μm, a thermoplastic polyimide resin and a polyacrylic acid were mixed in a ratio of 80:15:5 (weight ratio), and the mixture was formed into slurry-like mixture by using the NMP solvent. The resultant material was coated on the current collector in the same manner as the first example, roll-pressed, and heat-treated at 400° C. in vacuum for three hours to prepare a test electrode.

In positive electrodes, in addition to the arrangement of the aforementioned positive electrode, positive electrodes formed of positive electrode active materials to which any of Ca, Mg, Y and Zr was added were formed by mixing lithium carbonate, cobalt oxide, calcium oxide (CaO) or magnesium oxide (MgO) or yttrium oxide ($Y_2O_3$) or zirconium oxide ($ZrO_2$) in response to respective weight ratios of Li:Co:Ca=1:0.99:0.01 or Li:Co:Mg=1:0.99:0.01 or Li:Co:Y=1:0.99:0.01 or Li:Co:Zr=1:0.99:0.01 and other electrodes formed by the aforementioned method were used to fabricate batteries.

Apart from these arrangements, positive electrodes with LiF coating formed on the surfaces were formed by forming lithium fluoride (LiF) on the surface of the lithium cobalt oxide active material particles in a weight ratio of 3% by a mechano-chemical method, and rates of discharge capacity retention of respective positive electrodes were measured.

Measured results are shown in the following TABLE 6.

TABLE 6

| | 1st principal plane active material layer | | 2nd principal plane active material layer | | Surface Roughness Ra(μm) of Negative Electrode Current Collector | Electrolyte composition | Positive electrode material | | Discharge Capacity retention Rate (%) |
|---|---|---|---|---|---|---|---|---|---|
| | Material | Film Thickness (μm) | Material | Film Thickness (μm) | | | Main material | additive | |
| Example 6-1 | Vapor Deposited Si | 6 | Si (PI) | | 0.5 | EC:DEC = 40:60 | LiCoO$_2$ | | 85 |
| Example 6-2 | Apor Deposited Si | 6 | Si (PI) | | 0.5 | EC:DEC = 40:60 | LiCoO$_2$ | Ca | 86 |
| Example 6-3 | Vapor Deposited Si | 6 | Si (PI) | | 0.5 | EC:DEC = 40:60 | LiCoO$_2$ | Mg | 89 |
| Example 6-4 | Apor Deposited Si | 6 | Si (PI) | | 0.5 | EC:DEC = 40:60 | LiCoO$_2$ | Y | 90 |
| Example 6-5 | Vapor Deposited Si | 6 | Si (PI) | | 0.5 | EC:DEC = 40:60 | LiCoO$_2$ | Zr | 90 |
| Example 6-6 | Vapor Deposited Si | 6 | Si (PI) | | 0.5 | EC:DEC = 40:60 | LiCoO$_2$ | LiF | 89 |

TABLE 6 shows that of the arrangement having the Si deposited active material layer formed only on the first principal plane (i.e., only on one-side surface) as well as having the active material layer with the relatively small alloyed region with the current collector formed on the second principal plane, the arrangement where the additives were added to the active material layers of the positive electrodes particularly exhibits higher rates of discharge capacity retention.

Example 7

Example 7 will be described with reference to TABLE 7.

In the example, when negative electrodes were formed, first, tin (Sn) having a thickness of 4 μm was deposited on the copper foil in the same manner as the first example. Cobalt (Co) having a thickness of 2 μm was then deposited to form an active material layer on the first principal plane. Subsequently, the resultant product was annealed at 200° C. in vacuum for 12 hours. Any of graphite, powder silicon (Si) and tin (Sn) was deposited to form an active material layer on the second principal plane and electrodes were formed in the same manner as the first example.

Winding type batteries using the aforementioned laminated film described in the first example as the exterior member were formed by using these electrodes, and rates of discharge capacity retention thereof were measured. Measured results are shown in the following TABLE 7.

teristics may not also be obtained. Excellent cycle characteristics were obtained from the electrode having the active material layer containing silicon (Si) formed by vapor-phase deposition was formed only on one principal plane as well as having the active material layer formed on the other principal plane by coating carbon powder or silicon, or tin-based active material.

As described in the embodiments and Examples of the present invention, the negative electrode of the battery including the active material that changes drastically in volume when charging and discharging on both surfaces of the current collector may suppress crack or fracture on the negative electrode.

It should be noted that the materials available in the above-described embodiments and numerical value conditions such as their quantities, their treatment times and their dimensions are merely those of the suitable examples and also dimensions, shapes and placement relationships in the respective sheets of drawings are described schematically. That is, the present invention is not limited to those embodiments.

TABLE 7

| | 1st principal plane Active material layer | | 2nd principal plane Active material layer | | Surface Roughness Ra(μm) of Negative Electrode Current Collector | Electrolyte composition | Discharge Capacity Retention Rate (%) |
|---|---|---|---|---|---|---|---|
| | Material | Film Thickness (μm) | material | Film Thickness (μm) | | | |
| Example 7-1 | Sn (vapor deposited) + Co | 4 + 2 | Artificial Graphite (Gr) | | 0.5 | EC:DEC = 40:60 | 86 |
| Example 7-2 | Sn (vapor deposited) + Co | 4 + 2 | Gr + Si | | 0.5 | EC:DEC = 40:60 | 85 |
| Comparative Example 7-1 | Sn (vapor deposited) + Co | 4 + 2 | Sn vapor-deposited | | 0.5 | EC:DEC = 40:60 | 52 |

TABLE 7 shows that high rates of discharge capacity retention were obtained by not only including the arrangement having the Si deposited active material layer formed only on the first principal plane (i.e., only on one-side surface) as well as having the active material layer with the relatively small alloyed region with the current collector formed on the second principal plane, but also including the arrangement having a Sn deposited active material layer formed on the first principal plane (i.e., only on one-side surface) as well as having the active material layer with the relatively small alloyed region with the current collector formed on the second principal plane.

It should be noted that the arrangement having the active material layer formed by deposition using materials other than Si (silicon) may not prevent rates of discharge capacity retention from being lowered insofar as large alloyed regions are formed between the active material layer and the current collector of both surfaces.

According to the examples, when the active material layers containing silicon (Si) were deposited on both principal planes of the film-shape (strip-shape or thin film-shape) current collector by vapor-phase deposition, sufficient cycle characteristics may not be obtained. When the active material layer containing silicon (Si) is deposited on only one principal plane by vapor-phase deposition, sufficient cycle charac- For example, in the thickness of the active material layer of the battery having the related-art arrangement using the electrode including the active material layers are supported on both surfaces of the current collector, the active material layer supporting portion of the negative polarity electrode is generally wider in area than the active material layer supporting portion of the positive polarity electrode.

However, in the aforementioned embodiments of the present invention and the examples, the case in which the active material layers are widely formed on both surfaces of the current collector has been described so far by way of example. More specifically, according to the negative electrode having the active material layer partly supported on one side or on both surfaces of the current collector, if there is no facing positive electrode active material layers or there is a facing positive electrode active material layer only on one side, such portion may be removed. According to an embodiment of the present invention, it is sufficient that only a very small portion that supports the active material layer may be formed on both surfaces of the negative electrode current collector. In particular, when 50% or more of the active material layer forming area is supported on both surfaces to contribute on charging and discharging of the battery, large improvements according to the arrangement of the present invention may be expected.

Moreover, the combinations of the active material layers formed on the first and second principal planes of the negative electrode are not limited thereto. Particularly preferable combinations may be arrangements in which active material layers formed on the first and second principal planes are respectively a combination of a vapor-deposited Si layer and a powdery sintered Si layer, a combination of a vapor-deposited Si layer and a carbon material layer, a combination of a powdery sintered Si layer and a carbon material layer, a combination of a plating vapor-deposited Sn layer and a powdery sintered Sn layer, a combination of a plating vapor-deposited Sn layer and a carbon material layer, a combination of a powdery sintered Sn layer and a carbon material layer and the like.

While the examples including the liquid-form electrolyte has been described so far in the aforementioned embodiments, the present invention is not limited thereto; and gel-form electrolytes may also be used. In addition, battery containers, that is, outer shapes of batteries are not limited to those in the aforementioned second and third embodiments of the present invention. Various types and shapes of battery containers, that is, outer shapes of batteries may be used. The present invention may be modified and varied accordingly.

It may be understood by those skilled in the art that various modifications, combinations, sub-combinations and alterations may occur depending on design requirements and other factors insofar as they are within the scope of the appended claims or the equivalents thereof.

What is claimed is:

1. A battery comprising:
a positive electrode that includes an active material layer formed on a positive electrode current collector;
a negative electrode that includes a negative electrode current collector having two surfaces defining first and second parallel planes and active material layers formed on the first and second planes of the negative electrode current collector, the active material layer on the second plane having an alloyed region between the active material layer and the negative electrode current collector smaller than an alloyed region of the active material layer on the first plane of the negative electrode current collector; and
an electrolyte.

2. A battery according to claim 1, wherein the active material layer on the first plane of the negative electrode current collector has a columnar or block shape and the active material layer on the second plane of the negative electrode current collector is a powdery active material.

3. A battery according to claim 1, wherein the active material layer on the first plane of the negative electrode current collector being of a first material which contains silicon (Si) and the active material layer on the second plane of the negative electrode current collector being of a second material different than the first material but which also contains silicon (Si) or which contains tin (Sn).

4. A battery according to claim 1, wherein the positive electrode and the negative electrode are wound together.

5. A battery according to claim 1, wherein the first plane of the negative electrode current collector has an arithmetic mean roughness Ra equal to or greater than 0.2 μm.

6. A battery according to claim 1, wherein the active material layer on the first plane of the negative electrode current collector is formed by a chemical vapor deposition.

7. A battery according to claim 1, wherein the active material layer on the first plane of the negative electrode current collector contains silicon (Si) and oxygen (O) with the oxygen (O) being present in the amount of 3 atomic % or more to 45 atomic % or less.

8. A battery according to claim 1, wherein the active material layer on the first plane of the negative electrode current collector has a multilayer structure including high and low oxygen concentration regions repeatedly formed in the direction approximately perpendicular to the first plane.

9. A battery according to claim 1, wherein the electrolyte contains a sultone compound.

10. A battery according to claim 1, wherein the electrolyte contains a cyclic carbonate compound having an unsaturated bond.

11. A battery according to claim 1, wherein the electrolyte contains a compound having a structure in which hydrogen (H) of cyclic carbonate or chain carbonate is partly substituted with fluorine (F).

12. A battery according to claim 1, wherein the active material layer of the positive electrode includes:
an inner portion formed of a lithium transition metal composite oxide, and
a surface layer containing at least one compound selected from a lithium transition metal composite oxide different from the lithium transition metal composite oxide forming the inner portion, a metal oxide, a metal halide, a metal phosphate, and a metal sulfate.

13. A battery according to claim 1, wherein
the alloyed region of the active material on the second plane is not provided between the active material layer of the second plane and the current collector, and
the alloyed region of the active material on the first plane is provided between the active material layer of the first plane and the current collector.

* * * * *